(12) United States Patent
Vanmarcke et al.

(10) Patent No.: US 9,511,530 B2
(45) Date of Patent: Dec. 6, 2016

(54) METHOD FOR PRODUCING A PLASTIC ARTICLE, AND PART OF A BLOW-MOULD

(71) Applicant: KAUTEX MASCHINENBAU GMBH, Bonn (DE)

(72) Inventors: Rene Vanmarcke, Troisdorf (DE); Thilo Schmidt, Cologne (DE); Willi Doehmen, Moenchengladbach (DE); Olaf Weiland, Bad Honnef (DE); Stefan Walbroel, Sankt Augustin (DE)

(73) Assignee: KAUTEX MASCHINENBAU GMBH, Bonn (DE)

( * ) Notice: Subject to any disclaimer, the term of this patent is extended or adjusted under 35 U.S.C. 154(b) by 253 days.

(21) Appl. No.: 14/376,220

(22) PCT Filed: Jan. 16, 2013

(86) PCT No.: PCT/EP2013/050759
§ 371 (c)(1),
(2) Date: Aug. 1, 2014

(87) PCT Pub. No.: WO2013/113558
PCT Pub. Date: Aug. 8, 2013

(65) Prior Publication Data
US 2014/0374964 A1    Dec. 25, 2014

(30) Foreign Application Priority Data
Feb. 2, 2012   (DE) ........................ 10 2012 001 928

(51) Int. Cl.
B29C 49/20    (2006.01)
B29C 49/42    (2006.01)
(Continued)

(52) U.S. Cl.
CPC ........... *B29C 47/0054* (2013.01); *B29C 49/20* (2013.01); *B29C 49/4247* (2013.01);
(Continued)

(58) Field of Classification Search
CPC ............. B29C 49/20; B29C 2049/2073; B29C 49/4247; B29C 49/4278; B29C 47/0054; B29C 51/267
See application file for complete search history.

(56) References Cited

U.S. PATENT DOCUMENTS 3,162,707 A    12/1964   Scott, Jr.
5,779,968 A    7/1998    Richwine
(Continued)

FOREIGN PATENT DOCUMENTS

CN    1178736 A    4/1998
CN    1668452 A    9/2005
(Continued)

OTHER PUBLICATIONS

Partial machine translation of JP 2006-103116 A dated Apr. 20, 2006 obtained from the espace website.*

*Primary Examiner* — Robert B Davis
(74) *Attorney, Agent, or Firm* — Lucas & Mercanti, LLP

(57) ABSTRACT

A method for producing a plastic article includes extruding an approximately tubular blank from an extrudate and shaping the blank into a hollow body inside a blow-mold using differential pressure, wherein at least one insertable part is introduced into the interior of the partially molded plastic article before the latter is fully shaped into a finished plastic article, and the tubular blank is arranged between at least two halves of a blow-mold by means of an intermediate frame.

17 Claims, 10 Drawing Sheets

(51) Int. Cl.
*B29C 47/00* (2006.01)
*B29D 22/00* (2006.01)
*B29L 22/00* (2006.01)

(52) U.S. Cl.
CPC .......... *B29C 49/4278* (2013.01); *B29D 22/00* (2013.01); *B29C 2049/2073* (2013.01); *B29L 2022/00* (2013.01)

(56) References Cited

U.S. PATENT DOCUMENTS

| | | | |
|---|---|---|---|
| 8,617,344 | B2 | 12/2013 | Rohde |
| 9,180,775 | B2 | 11/2015 | Sun |
| 2002/0105115 | A1* | 8/2002 | Sadr .................... B29C 47/0066 264/510 |
| 2008/0061470 | A1* | 3/2008 | Borchert ................ B29C 49/20 264/250 |
| 2009/0162472 | A1 | 6/2009 | Aoki |

FOREIGN PATENT DOCUMENTS

| | | | | |
|---|---|---|---|---|
| DE | 4142114 A1 | 6/1992 | | |
| DE | 10231866 A1 | 1/2004 | | |
| DE | 602 18 237 T2 | 10/2007 | | |
| DE | WO 2010149336 A2 * | 12/2010 | ............. | B29C 49/18 |
| DE | 10 2009 030 492 A1 | 1/2011 | | |
| JP | S57 159623 A | 10/1982 | | |
| JP | 2003074770 A | 3/2003 | | |
| JP | 2006103116 A | 4/2006 | | |
| WO | 2011020223 A1 | 2/2011 | | |

* cited by examiner

METHOD FOR PRODUCING A PLASTIC ARTICLE, AND PART OF A BLOW-MOULD

CROSS-REFERENCE TO RELATED APPLICATIONS

This application is a 371 of PCT/EP2013/050759 filed Jan. 16, 2013, which in turn claims the priority of DE 10 2012 001 928.9 filed Feb. 2, 2012, the priority of both applications is hereby claimed and both applications are incorporated by reference herein.

BACKGROUND OF THE INVENTION

The invention relates to a method for producing a plastic article, comprising extruding a tubular preform from an extrudate and also forming the preform into a hollow body inside a blow molding tool having at least two halves by applying differential pressure, wherein at least one insert is introduced into the interior of the plastic article.

The invention also relates to an intermediate frame for a blow molding tool.

In particular when producing large plastic tanks by extrusion blow molding, it is often desirable to introduce inserts into the tank to be completed. For example, motor vehicle fuel tanks made of thermoplastic material are often provided with functional components/inserts. The inserts can be introduced manually through one or more inspection openings provided in the tank after said tank has been produced. In particular in the case of fuel tanks made of thermoplastic material, it is problematic that the plastics used for this purpose, generally HDPE, are not diffusion-resistant to hydrocarbons. For this reason, fuel tanks made of thermoplastic material are produced from co-extrudates with barrier layers for hydrocarbons. In this way it is possible to ensure the leak-tightness of the fuel tank to the greatest extent, even though, in the case of a multi-layer wall structure, the barrier layer is damaged/interrupted by openings that are subsequently to be provided in the tank wall, such that potential leakage points which have to be sealed in an expensive manner once the tank has been completed are created in the region of openings in the tank wall. In particular in order to introduce inserts into the tank which are larger than the inspection openings to be provided, it is possible, using the method disclosed in DE 602 18 237 T2, for the inserts to be encapsulated by extrusion blow molding during the shaping of the tank. However, the fastening of some of the inserts, for example the valves, still requires a plurality of openings in the tank wall.

Recently every effort has been directed at introducing all the inserts, as far as possible, into the fuel tank already during its production, in order to keep the number of openings required in the tank wall as low as possible.

The use of intermediate frames for blow molding has become known in the prior art. Thus, DE 102 31 86 A1 describes a method of the generic type for producing a plastic hollow body, in which the tubular plastic preform is cut into two sheet-like semifinished products and the semifinished products are inserted separately into a blow molding tool through a removable intermediate frame. Subsequently, two half-shells are formed, the tool halves being separated from one another by the removable intermediate frame, such that the half-shells do not make contact with one another. After the tool halves have been opened and the intermediate frame has been removed, inserts are attached to the inner side of at least one half-shell. Subsequently, the half-shells are joined to form the plastic hollow body.

This procedure gives rise to difficulties in the handling of the preform which is split into sheet-like semifinished products. The preform is very unstable owing to the greatly heated plastic. The insertion of the sheet-like semifinished products is additionally made more difficult by virtue of the fact that the two semifinished products must not make mutual contact either during transportation to the blow molding tool or in the blow molding tool, since they would otherwise stick to one another. The intermediate frame provides only a limited remedy here.

DE 10 2009 030 492 A1 proposes slitting open the tubular preform to give a C-shaped cross section and then inserting said preform into the blow molding tool. As a result of this C-shaped cross section, the more dimensionally stable round cross-sectional shape is largely retained. The interior of the preform is accessible via the slit, and therefore inserts can be introduced before the final blow molding. As a result of the only partial opening of the preform, however, the scope for movement for introducing in particular large inserts is limited.

BRIEF SUMMARY OF THE INVENTION

The invention is based on the object of providing an alternative to the aforementioned methods which allows for even large inserts to be introduced without any problems, with improved handling of the extrudates.

Proceeding from a method for producing a plastic article of the type mentioned in the introduction, the object is achieved in that an intermediate frame is arranged in a tubular preform,
the tubular preform is arranged between at least two halves of the blow molding tool by means of the intermediate frame,
the tubular preform is partially preformed in the blow molding tool with the aid of the intermediate frame,
subsequently the tubular preform is separated into at least two parts,
for the introduction of the at least one insert, the blow molding tool is opened in such a manner that one part of the separated preform remains in each half of the blow molding tool, followed by the following method steps:
(a) removing the intermediate frame between the at least two halves of the blow molding tool,
(b) introducing the at least one insert into the interior of the partially shaped plastic article,
(c) closing the blow molding tool with the parts of the preform and the at least one insert, and
(d) fully shaping the preform into a hollow body.

This proposed solution makes it possible to take a hollow plastic article from a die by means of a gripper and insert it into a blow molding tool, the preform remaining largely stable during transportation since the stabilizing cross-sectional shape of the tubular preform, which is round to the greatest possible extent, is retained for the transportation from the extruder head to the blow molding tool. The accessibility to the inner region of the preform is ensured optimally by the preform being cut open into at least two parts only after preforming. All of the desired inserts can be introduced; these stick to the pasty preform and are fixedly integrated in the finished blow-molded article after the blow molding tool has been closed and after the blow molding of the plastic hollow body has been completed.

However, the tubular preform can also be introduced into the blow molding tool already as a partially separated preform. In this respect, the tubular preform can be inserted with an approximately C-shaped cross section into the blow molding tool, wherein the extrudate which is emerging or has already emerged from the extruder head is correspondingly pulled apart for this purpose. Here, too, the largely round cross section of the preform, which gives the preform a certain inherent stability, is retained.

Irrespective of whether the tubular preform has a closed or C-shaped cross section, the intermediate frame is used to the effect that the at least two parts formed from the preform can be handled separately from one another and do not bond to one another.

For this purpose, the intermediate frame is arranged in the preform before the latter is separated into at least two parts, in particular by the intermediate frame being introduced into the preform or the tubular preform being moved over the intermediate frame.

The preform is placed against the intermediate frame by the latter being spread apart. In the case of a C-shaped preform which has already been pulled apart, use can be made of a rigid intermediate frame; the preform can then be placed against the intermediate frame by means of mold spacers, which are moved correspondingly. The use of mold spacers can also be provided when using intermediate frames which can be spread apart. Mold spacers are understood to be parts of the blow molding tool which are arranged upstream of the actual blow mold and, like sliders, press the preform against a counter mold, here the intermediate frame, and therefore simplify, for example, the preliminary blow molding without the blow molding tool having to be entirely closed.

Provision is thus made either to pull the preform over an intermediate frame by means of the gripper or to push the intermediate frame into the preform held by the gripper. The intermediate frame is in this respect designed in such a way that, once it is located within the preform, it can be spread apart until the preform extends around the intermediate frame and bears against it. The intermediate frame with the preform positioned around it is in this respect arranged in such a way that it is located between the two halves of the blow molding tool after the blow molding tool has been closed. In addition, as already stated above, mold spacers can be incorporated.

In addition, the temperature of the intermediate frame can be controlled, as a result of which the bearing of the preform against the intermediate frame is promoted.

According to one development, it is provided that the preform is preformed by way of blowing nozzles arranged in the intermediate frame. This has the advantage that the two tool halves can be moved independently of supply lines for the blow molding process, since these are arranged entirely on the intermediate frame.

The preform is advantageously separated into at least two parts by means of a separating apparatus arranged in the intermediate frame. In this respect, the separating apparatus can be arranged in the intermediate frame in such a way that it passes around the frame once, or else a plurality of separating apparatuses are arranged on the circumference and pass around only partial regions. Similarly, the separating apparatus can be arranged in or on one of the halves of the blow molding tool or can be externally supplied separately, as will be explained further below with reference to an example.

The separating apparatus provided here can be, for example, a blade, hot separation, a laser or severing by means of appropriate cutting edges in the tool halves.

However, it is also similarly conceivable that the preform is separated into at least two parts by means of a separating apparatus which is applied from the outside in the region of the intermediate frame. It is thus proposed, for example, to apply one or more blades from the outside in the region of the intermediate frame, in order to separate the preform and therefore to use the intermediate frame as it were as a cutting substrate.

In a further development, it is provided that two separate cavities are formed between the preform and the intermediate frame by means of the intermediate frame.

In this case, the intermediate frame has a partition wall, in which case either use is made of a rigid frame in conjunction with the C-shaped preform, or, if a foldable intermediate frame is used, a somewhat more complex construction is required for the concomitantly folding partition wall. In both cases, however, the effect is that the preform now forms two separate cavities which can be subjected to different pressures by way of blowing nozzles, and the preform is preformed in this way. In this respect, the blowing nozzles can be arranged in the intermediate frame.

The application of different pressures in the two chambers may be necessary, for example, when the intention is to produce a plastic hollow body of which one half has a relatively complex surface contour.

In a further development, it is provided that the inserts are introduced into the parts of the partially shaped preform by means of a, preferably multi-axial, manipulator.

To this end, the two halves of the blow molding tool are moved apart beforehand and the intermediate frame is removed.

Since the two tool halves with the parts of the preform arranged therein can be opened and moved to the greatest possible extent without any limitations by means of the method according to the invention, every location in the interior of the plastic article is accessible. All desired inserts, from simple inserts to relatively complex inserts, can accordingly be positioned and inserted therein. Multi-axial robots correspondingly programmed for this purpose can cope with this task without any problems, provision being made for the inserts to be inserted into the two tool halves individually, together or else in succession.

It is particularly advantageous if at least one of the two halves of the blow molding tool is provided with means which are moved, before the removal of the plastic article, in such a manner that excess parts of the preform, what is termed flash, which are not required for the intended use of the plastic article, are cut off, the excess parts remaining on one of the blow mold halves.

However, it is also conceivable to already cut off the excess parts before the plastic article is shaped; these excess parts remain on the intermediate frame and are removed therewith. In certain circumstances, the flash can be cut off as early as during separation of the preform.

According to this development, it is thus proposed that the peripheral edge around the plastic article which is no longer required for the finished article is already cut off in the tool. This minimizes the corresponding reworking time on the plastic hollow body which has undergone final blow molding, since all of the plastic parts which are not to be used have already been cut off. By way of example, the gripper for removing the plastic part from the blow molding tool can be configured in such a way that it also directly removes this excess flash proportion which has been cut off and retained in the tool, puts the finished plastic hollow body down and supplies the flash proportion for reutilization for recycling plastics.

The object is additionally achieved by an intermediate frame in that the intermediate frame is provided with flexible binding means, as a result of which the circumferential geometry of the intermediate frame is variable. According to one development, it is provided that openings for the introduction of blowing air are provided in the intermediate frame.

It is thus proposed that the intermediate frame is foldable or pivotable in a mold, so that either the intermediate frame can easily be introduced into the preform or the preform can be placed over the intermediate frame in a simplified manner. The final circumferential geometry of the intermediate frame is produced only after individual frame parts have been folded out or pivoted, this making it possible for the preform arranged around it to wrap around the intermediate frame, almost like a packaging film. The circumferential geometry of the intermediate frame is embodied here in such a way that the end faces of the intermediate frame correspond largely to the end faces of the halves of the blow molding tool which are used, since the end faces of the intermediate frame and the end faces of the two halves of the blow molding tool form a sealing face, once the blow molding tool with the intermediate frame lying therebetween has been closed.

It is advantageous that blowing nozzles are screwed into the openings for the blowing air.

It is therefore possible, depending on requirements, for different blowing nozzles for different blowing pressures to be screwed into the openings arranged in the intermediate frame, without it being necessary for the supply lines, which are advantageously attached to the outer side of the intermediate frame, to be jointly changed.

It is advantageous that the intermediate frame consists of a plurality of webs connected with binding means, it being proposed according to the invention to use joints here. However, it is also conceivable to use any other type of binding means which make it possible for the intermediate frame to be spread apart or folded out.

According to one development, it is provided that the intermediate frame has a partition wall, the latter making it possible to split the preform into two separate chambers, in which case it is possible for the two chambers to be subjected to different pressures. If a partition wall is used, the intermediate frame can also be in one piece, i.e. it is not foldable or pivotable. However, this is not absolutely necessary, since a foldable intermediate frame is also conceivable when using a, for example flexible, partition wall which jointly pivots or jointly folds, depending on the configuration of the folding mechanism of the intermediate frame.

BRIEF DESCRIPTION OF THE DRAWINGS

The drawings schematically show an apparatus according to the invention and explain the method.

DETAILED DESCRIPTION OF THE PREFERRED EMBODIMENTS

Figure 1:
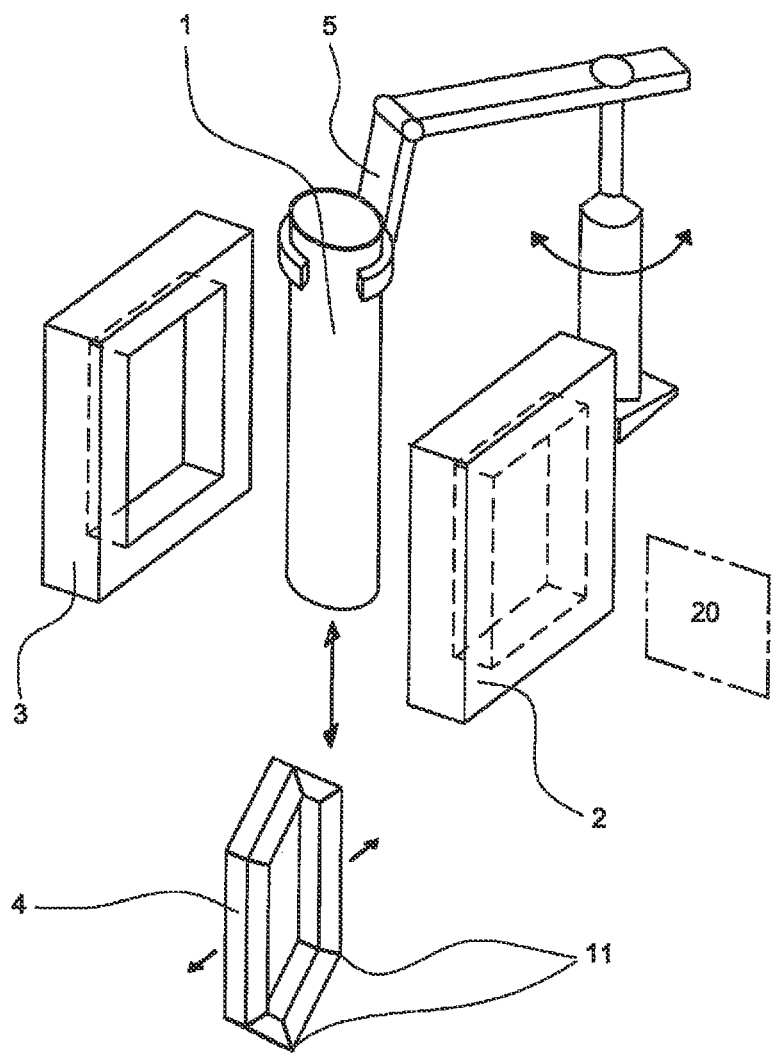
FIG. 1 shows a perspective view of a device for blow molding plastic articles with a closed preform and the use of a foldable intermediate frame.

FIG. 1 shows a perspective view of a typical blow molding system, in which a tubular preform 1 is inserted by means of a gripper between a first half 2 and a second half 3 of a blow molding tool. The possibility for the gripper 5 to be pivoted is denoted by the semicircular double-headed arrow. A foldable or pivotable intermediate frame 4 is arranged in the preform 1. Either this intermediate frame 4 can be pushed from below into said preform, or the preform can be placed over the already positioned intermediate frame 4.

Figure 2:
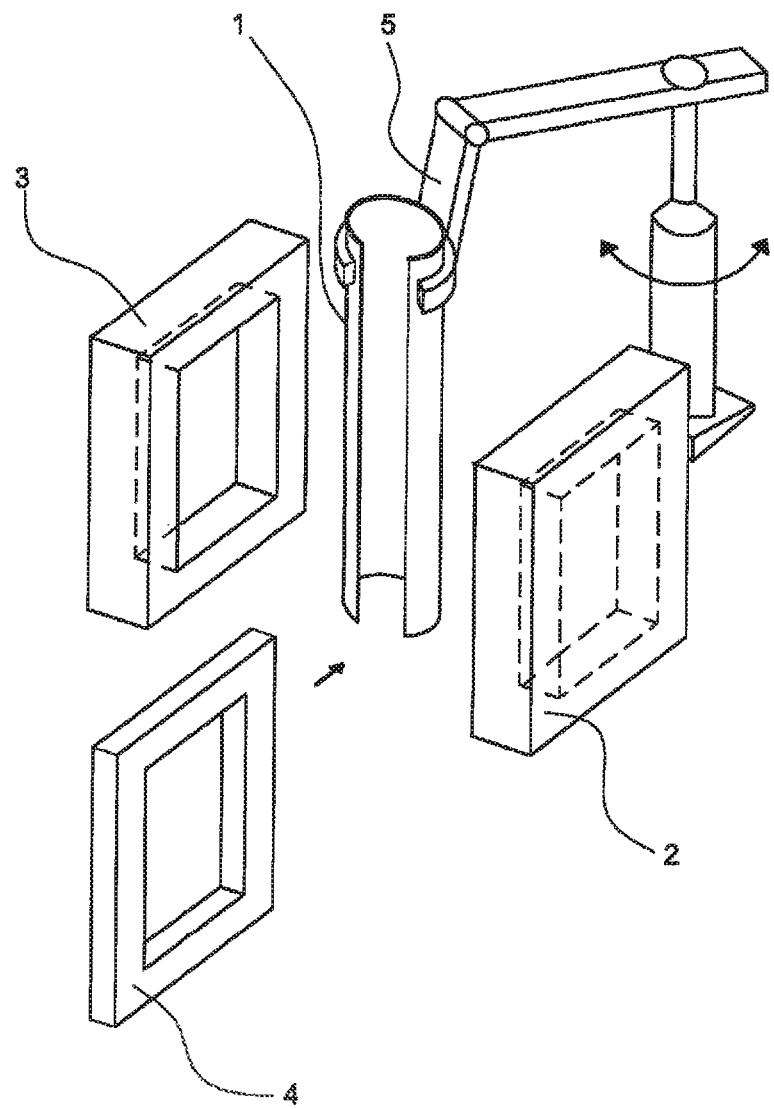
FIG. 2 shows a perspective view of a device for blow molding plastic articles with a C-shaped preform and a rigid intermediate frame.

FIG. 2 corresponds to an arrangement as shown in FIG. 1, the same item numbers also denoting the same objects.

FIG. 2 differs from FIG. 1 in that the blew molding system of FIG. 2 has a preform 1 with a C-shaped cross section and use is made of a rigid frame. The preform has therefore already been slit open at least on one side even before it is introduced into the two blow mold halves. The intermediate frame 4 used is rigid and is moved into the preform 1 at the side in the region of the slit. Here, too, it is of course possible to move the C-shaped preform over the rigid intermediate frame 4.

In both cases, the gripper 5 has taken the preform 1 from an extruder head (not shown) and moved it into the region between the two tool halves 2 and 3.

Figure 3:
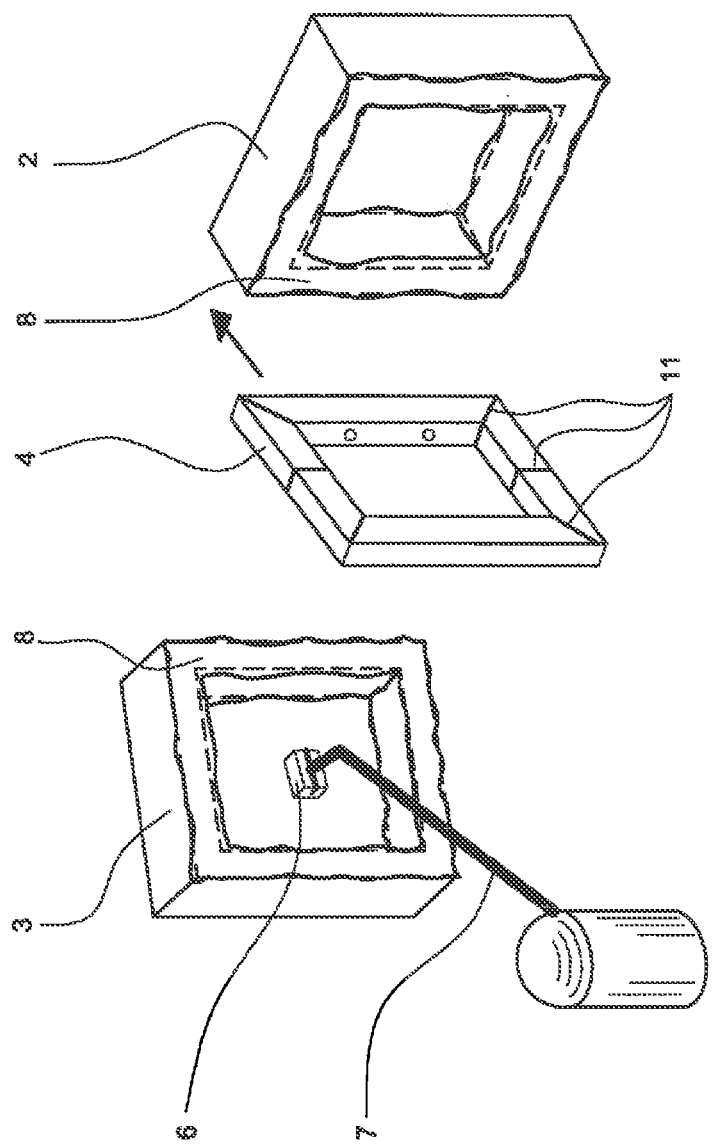
FIG. 3 shows a perspective view of an open blow mold, into which an insert is introduced.

FIG. 3 shows the two open tool halves 2, 3 of the blow molding tool, in each of which there is arranged one part 8 of the slit preform 1. By way of example, an insert 6 is inserted into the part 8 of the preform 1 in the tool half 3 by means of a robot arm 7 of a robot (not shown) and pressed against the still soft inner wall of the part 8 of the preform 1. The removable intermediate frame 4 exhibits the binding means 11, which are required for folding or pivoting the intermediate frame 4. The arrow merely indicates that the intermediate frame 4 between the two halves 2 and 3 of the blow molding tool can be removed, but does not indicate the direction of movement of the intermediate frame 4.

FIGS. 4 to 13 which follow schematically show individual method steps in sectional illustrations through the blow molding tool. The sectional plane 20 is outlined in FIG. 1.

Figure 4:
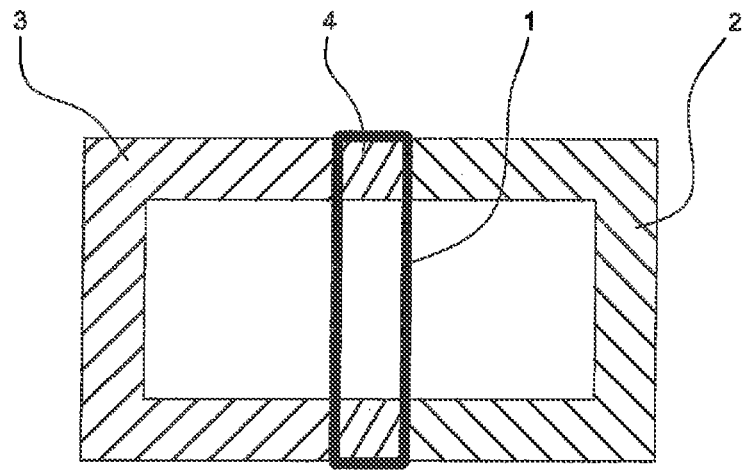
FIG. 4 shows a section through the blow molding tool, in which the preform rests on the intermediate frame.

FIG. 4 shows the closed blow molding tool halves 2 and 3, the intermediate frame 4, around which the preform 1 extends, being arranged between the two halves.

FIG. 5 again shows the closed blow molding tool with the two blow molding tool halves 2 and 3 and the intermediate frame 4 arranged therebetween, where here the preform 1 has been preformed by way of the blowing nozzles (not shown) in the intermediate frame 4 and already bears largely against the inner wall of the blow mold cavity.

FIG. 6 again shows the two blow molding tool halves 2 and 3, but here in a partially open state. The preform 1 has already been separated into two parts 8, these being located in respectively one of the two tool halves 2 and 3. The intermediate frame is no longer connected to the tool halves or to the preform 1 and can be removed.

Figure 7:
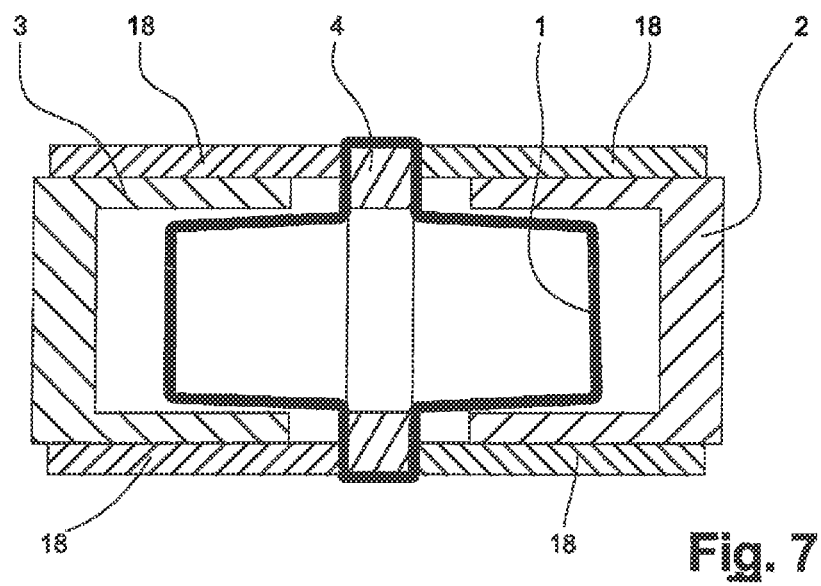
FIG. 7 shows a variant to FIG. 5 with mold spacers.

FIG. 7 shows a variant using a mold spacer 18. As in FIG. 5, the preform 1 surrounds the intermediate frame 4, but it is not blow molding tool halves 2 and 3 which seal the preform 1 against the intermediate frame 4, but rather mold spacers 18 arranged on the blow molding tool halves.

Figure 8:
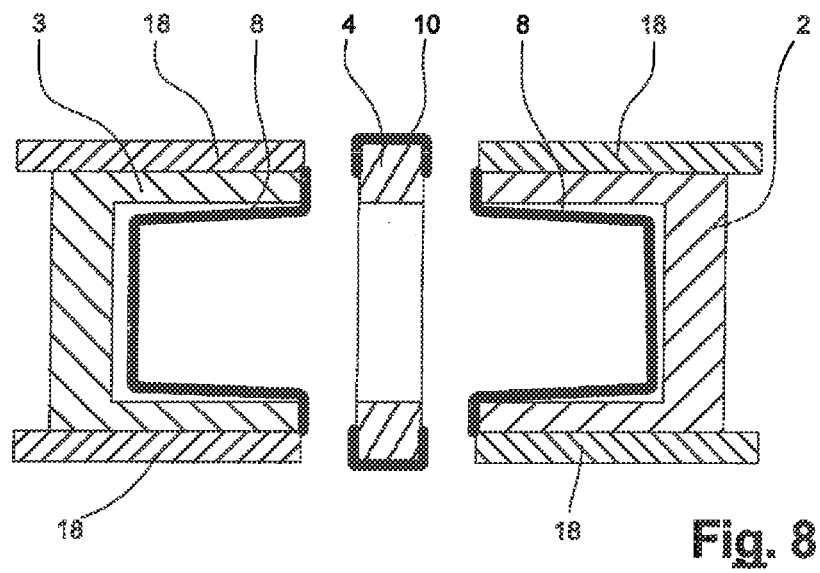
FIG. 8 shows the variant shown in FIG. 7 after preforming and after the flash has been cut off.
Figure 9:
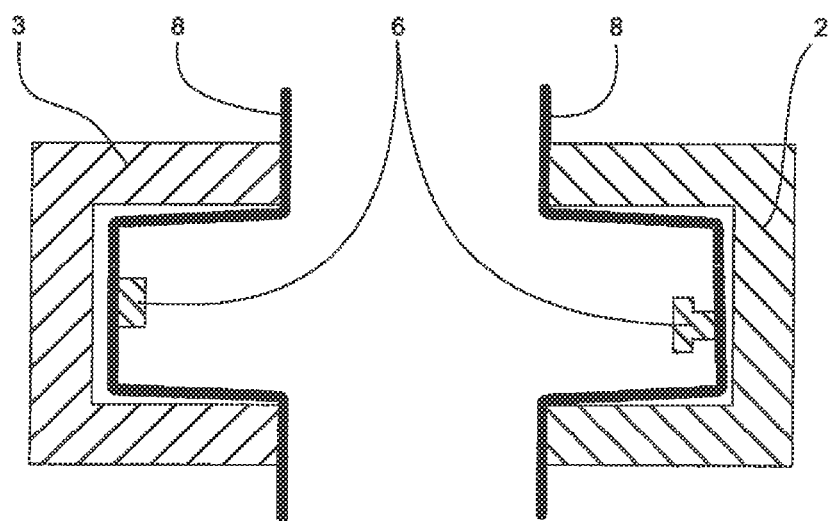
FIG. 9 shows a section through the open blow molding tool, in which inserts have been introduced.

FIG. 8 shows the blow molding tool halves 2 and 3 with a preform 1 which has been separated into three parts. Two parts 8 are located in the tool halves 2 and 3; the third part 10 adheres to the intermediate frame 4 as excess plastic waste which is not required for the article, what is termed flash, and is removed together with said intermediate frame.

Figure 5:
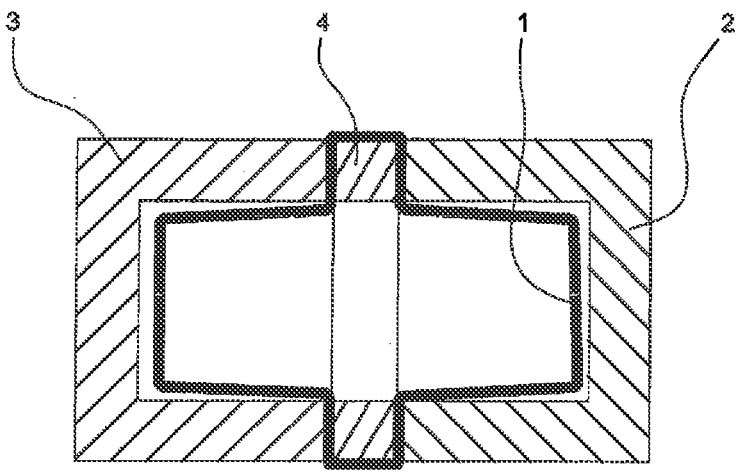
FIG. 5 shows a section through the blow molding tool, in which the preform has been pre-blown.
Figure 6:
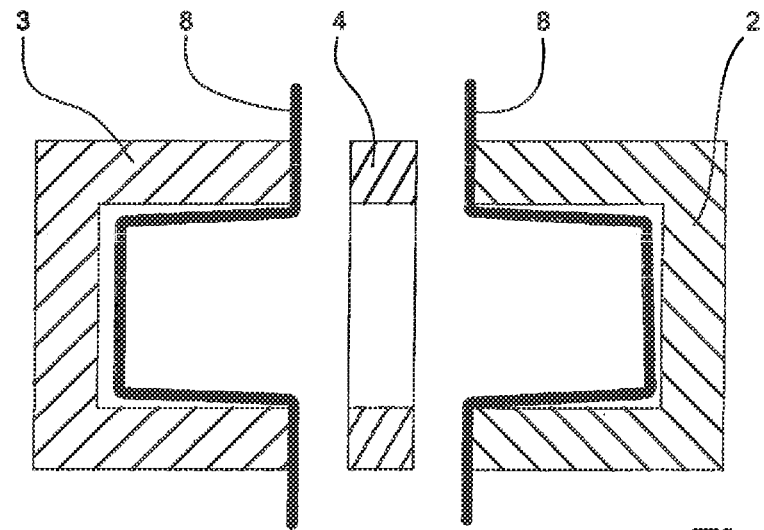
FIG. 6 shows a section through the half-open blow molding tool after the separation of the preform.

FIG. 9 again shows the open blow molding tool as per the embodiments shown in FIGS. 4 to 6, where in turn one part 8 of the preform 1 is located in the blow molding tool half 3 and a further part 8 of the preform 1 is located in the blow molding tool half 2. An insert 6 is arranged in each part 8 of the preform 1. It should be noted that the two blow molding tool halves 2 and 3 do not necessarily have to be opened in one axis. Owing to the separation of the preform into at least two parts 8, it is possible for the tool to be opened in any axis.

Figure 10:
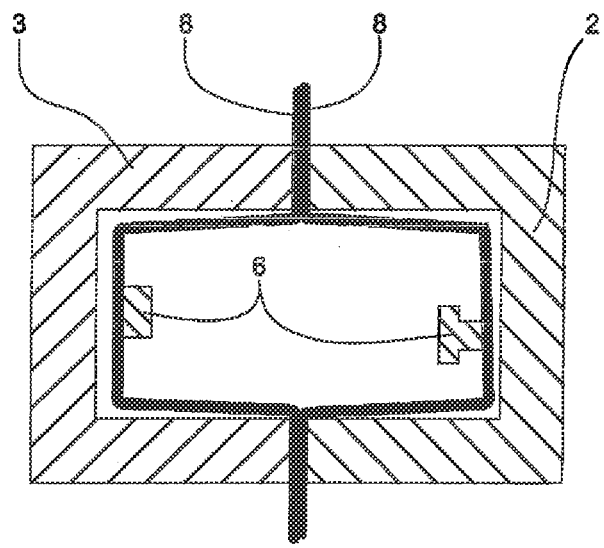
FIG. 10 shows a section through the blow molding tool which has been closed with the inserts.

FIG. 10 shows the re-closed blow molding tool, here the intermediate frame 4 having been removed such that the parts 8 of the preform 1 with the inserts 6 located therein are now connected to one another by the two blow molding tool halves 2 and 3 being closed.

Figure 11:
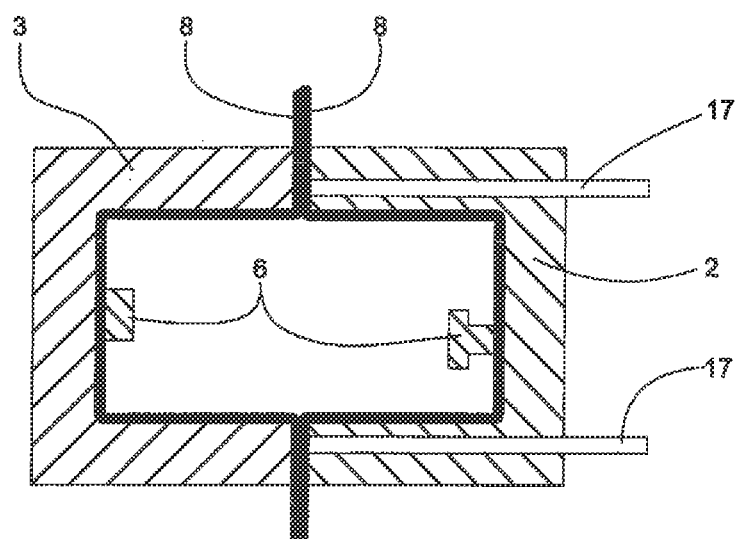
FIG. 11 shows a section through the closed blow molding tool and the plastic article which has undergone final blow molding with the inserts.

In the illustration shown in FIG. 11, the plastic article 9 has been shaped, that is to say the parts 8 of the preform 1 have been moved completely against the inner wall of the blow molding tool by means of the blowing pressure and thus enclose the inserts 6 in their interior. FIG. 11 furthermore shows separators 17, by means of which parts of what was the preform 1 which are no longer required can be cut off by moving said separators inside the tool.

Figure 12:
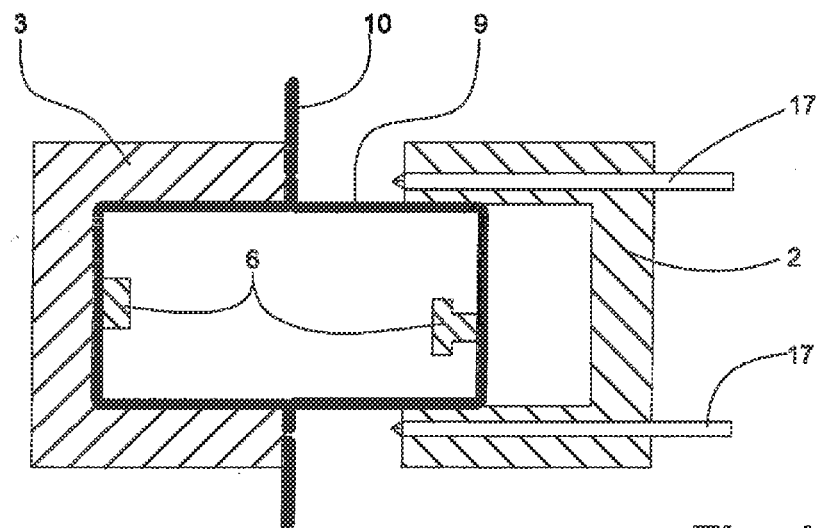
FIG. 12 shows a section through the open blow molding tool with a plastic article adhering in one half.

As can be seen in FIG. 12, the plastic article 9 which has undergone final blow molding remains in one of the two tool halves, here in the tool half 3, and the excess flash 10, which has been cut off from the plastic article 9 by way of the separators 17, likewise remains on this tool half. Once the blow molding tool half 2 has been moved to a sufficient extent, the plastic article 9 can be removed.

Figure 13:
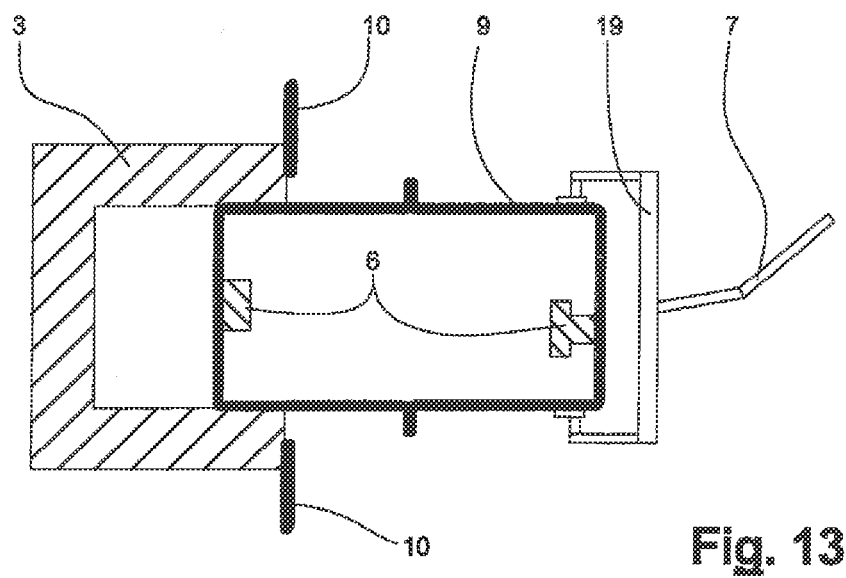
FIG. 13 shows a section through the blow molding tool, in which the plastic article is removed.

FIG. 13 shows this step. This figure in turn schematically shows the blow molding tool half 3, to which the flash 10 is still adhering. The plastic article 9 which has undergone final blow molding is removed by means of a robot (not shown) by means of a gripper 19 and a robot arm 7. The flash 10 can be removed either directly in the same operation by the robot or in a later operation similarly by means of a robot arm.

Figure 14A:
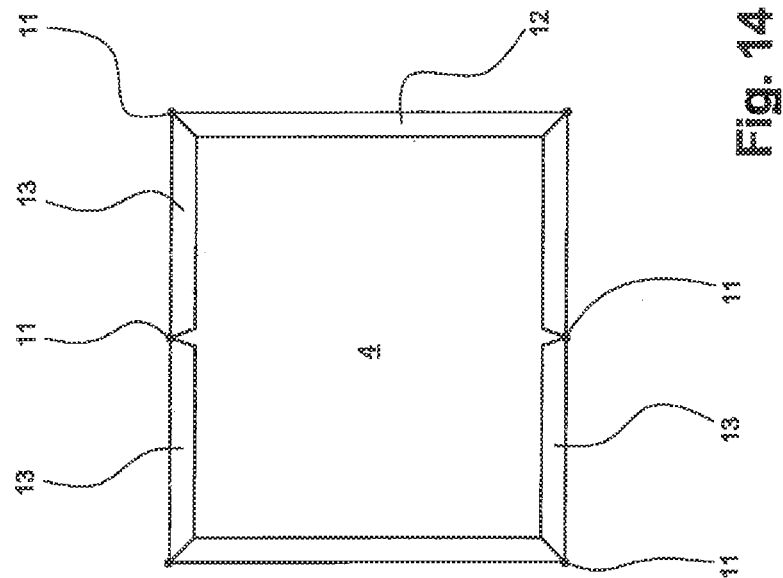
FIG. 14 shows an intermediate frame which can be spread apart.
FIG. 14b shows the intermediate frame of FIG. 14 that has been spread apart.
Figure 14B:
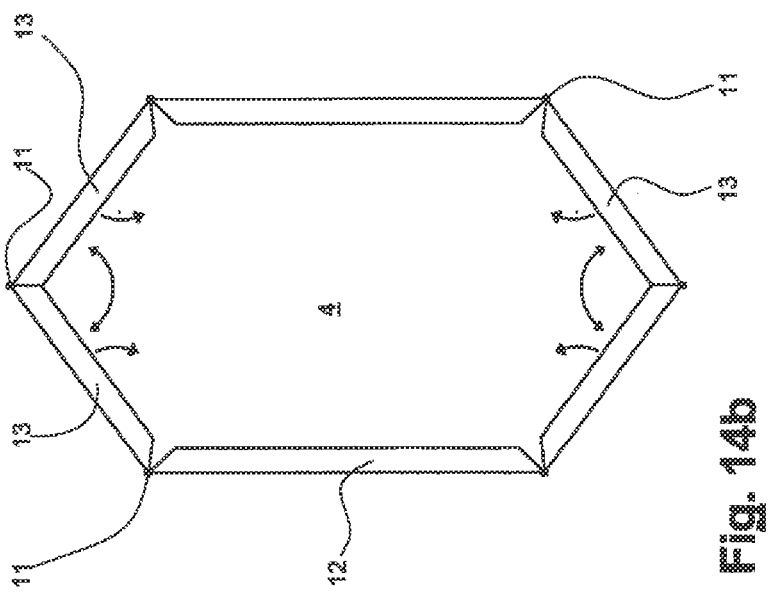

FIG. 14 shows purely schematically the concept of the pivotable intermediate frame 4. FIG. 14 represents an intermediate frame having at least two fixed webs 12 and a plurality of pivotable webs 13. Binding means 11, here in the form of joints, are arranged between the webs. These make it possible for the pivotable webs 13 to be collapsed in such a manner that the distance between the two rigid webs 12 is increased and therefore, for example, the preform is tensioned around the intermediate frame. This is shown schematically in FIG. 14b, the intention here being merely to illustrate the principle, since the intermediate frame has to largely reproduce the end face of the blow molding tool and will therefore form a rectangle in extremely rare cases.

Figure 15:
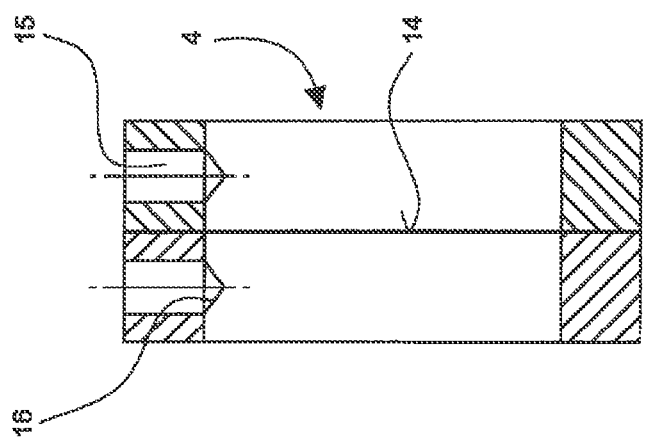
FIG. 15 shows a section through the intermediate frame.

FIG. 15 shows a section through an intermediate frame 4, a partition wall 14 being arranged here in the center of the intermediate frame. Openings 15, into which blowing nozzles 16 are mounted, are provided in one part of the intermediate frame.

Figure 16:
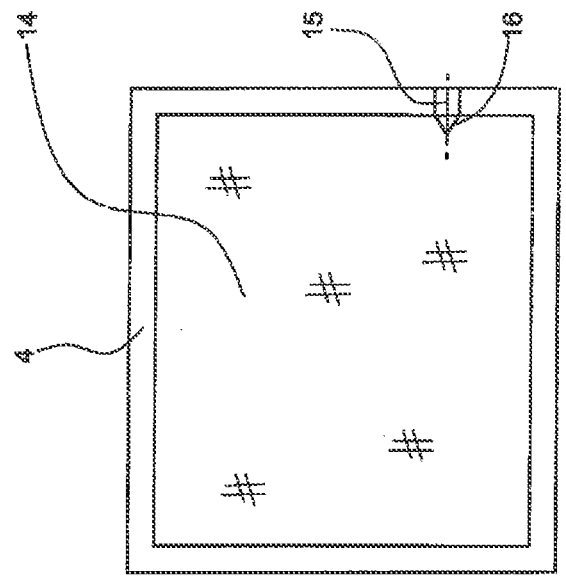
FIG. 16 shows an intermediate frame with a partition wall.

FIG. 16 shows, again only schematically to illustrate the concept, a standard intermediate frame 4 with a partition wall 14, the opening 15 and a blowing nozzle 16, here too the intermediate frame 4 being shown as a rectangle only to illustrate the concept.

The method according to the invention, in conjunction with the intermediate frame according to the invention, makes it possible to produce in particular larger blow-molded plastic articles into which even relatively complex and/or large inserts can easily be incorporated, since, as a result of the preform being separated into at least two parts and the fact that the blow molding tool can then be opened wide, the introduction of the inserts is not hindered. At the same time, the handling of the preform is improved considerably.

LIST OF REFERENCE SIGNS

1 Preform
2 First half of a blow molding tool
3 Second half of a blow molding tool
4 Intermediate frame
5 Gripper
6 Insert
7 Robot arm
8 Half of 1
9 Plastic article
10 Flash
11 Binding means in 4
12 Web of 4
13 Pivotable web of 4
14 Partition wall in 4
15 Opening for blowing air
16 Blowing nozzle
17 Separator for 10
18 Mold spacer
19 Further gripper
20 Sectional plane

The invention claimed is:

1. A method for producing a plastic article by extruding a tubular preform from an extrudate and forming the preform into a hollow body inside a blow molding tool having at least two halves by applying differential pressure, the method comprising the steps of:
   arranging an intermediate frame in the tubular preform,
   arranging the tubular preform between the at least two halves of the blow molding tool using the intermediate frame,
   partially preforming the tubular preform in the blow molding tool with the aid of blowing nozzles in the intermediate frame, thereby producing a partially preformed article, after said step of partially preforming, separating the partially preformed article into a separated preform having at least two parts, opening the blow molding tool such that one of the at least two parts of the separated preform remains in each half of the blow molding tool, removing the intermediate frame between the at least two halves of the blow molding tool, introducing at least one insert into an interior of the partially preformed article, closing the blow molding tool with the at least two parts of the partially preformed article and the at least one insert, and fully shaping the partially preformed article into the hollow body to form the plastic article.

2. The method as claimed in claim 1, wherein the tubular preform has an approximately C-shaped cross section when the intermediate frame is inserted therein, wherein the extrudate which is emerging or has already emerged from the extruder head is correspondingly pulled apart to form the approximately C-shaped cross section.

3. The method as claimed in claim 1, wherein the preform is placed against the intermediate frame by one of spreading apart the intermediate frame and moving mold spacers.

4. The method as claimed in claim 1, wherein the step of separating the preform comprises using a separating apparatus arranged in the intermediate frame.

5. The method as claimed in claim 1, wherein the step of separating the preform comprises using separating means which are applied from the outside in the region of the intermediate frame.

6. The method as claimed in claim 1, wherein two separate cavities are formed between the preform and the intermediate preform when the intermediate frame is inserted in the preform.

7. The method as claimed in claim 6, wherein the preform is preformed by way of blowing nozzles, and each of the cavities is subjected to different pressures.

8. The method as claimed in claim 1, wherein at least one of the two halves of the blow molding tool is provided with separating means, and the method further comprises a step of cutting off excess parts of the preform using the separating means.

9. The method as claimed in claim 8, wherein the excess parts remain on the intermediate frame and are removed therewith.

10. A blow molding tool for producing a plastic article using the method of claim 1, the blow molding tool comprising:

two blow molding tool halves; and an intermediate frame, wherein the intermediate frame is arrangable in a tubular preform and is arrangable with the tubular preform between the two blow molding tool halves, the intermediate frame includes flexible binding devices, such that a circumferential geometry of the intermediate frame is variable, a final circumferential geometry of the intermediate frame is producible by folding out the flexible binding devices, and the final circumferential geometry of the intermediate frame is embodied in such a manner that the end faces of the intermediate frame and the end faces of the two blow molding tool halves form a sealing face, when the blow molding tool with the intermediate frame lying therebetween is closed.

11. The blow molding tool as claimed in claim 10, wherein the intermediate devices includes further openings for the introduction of blowing air.

12. The blow molding tool as claimed in claim 10, wherein the flexible binding devices of the intermediate frame comprise joints.

13. The blow molding tool as claimed in claim 10, wherein the intermediate frame includes a partition wall.

14. A blow molding tool for producing a plastic article using the method of claim 1, the blow molding tool comprising:

two blow molding tool halves;

an intermediate frame, wherein the intermediate frame is arrangable in a tubular preform and is arrangable with the tubular preform between the two blow molding tool halves, the intermediate frame includes flexible binding devices, such that a circumferential geometry of the intermediate frame is variable, and a final circumferential geometry of the intermediate frame is producible by folding out the flexible binding devices; and mold spacers arranged on the blow molding tool halves so that the mold spacers seal the preform surrounding the intermediate frame against the intermediate frame when the blow molding tool is closed.

15. The blow molding tool as claimed in claim 14, wherein the intermediate frame includes further openings for the introduction of blowing air.

16. The blow molding tool as claimed in claim 14, wherein the flexible binding devices of the intermediate frame comprise joints.

17. The blow molding tool as claimed in claim 14, wherein the intermediate frame includes a partition wall.

* * * * *